(12) United States Patent
Bang

(10) Patent No.: US 10,756,655 B2
(45) Date of Patent: Aug. 25, 2020

(54) RESOLVER MANAGEMENT DEVICE, RESOLVER SYSTEM INCLUDING THE SAME, AND OPERATING METHOD THEREOF

(71) Applicant: HYUNDAI AUTRON CO., LTD., Seoul (KR)

(72) Inventor: Sung Hoon Bang, Yongin-si (KR)

(73) Assignee: HYUNDAI AUTRON CO., LTD., Seoul (KR)

( * ) Notice: Subject to any disclaimer, the term of this patent is extended or adjusted under 35 U.S.C. 154(b) by 0 days.

(21) Appl. No.: 16/356,975

(22) Filed: Mar. 18, 2019

(65) Prior Publication Data

US 2019/0288619 A1  Sep. 19, 2019

(30) Foreign Application Priority Data

Mar. 19, 2018  (KR) .......................... 10-2018-0031405

(51) Int. Cl.

| H02P 1/00 | (2006.01) |
|---|---|
| H02P 6/185 | (2016.01) |
| G01D 5/247 | (2006.01) |
| G05F 5/00 | (2006.01) |
| G06F 1/04 | (2006.01) |

(52) U.S. Cl.
CPC ............. *H02P 6/185* (2013.01); *G01D 5/247* (2013.01); *G05F 5/00* (2013.01); *G06F 1/04* (2013.01)

(58) Field of Classification Search
CPC ....................... H02P 6/16; G05B 2219/41414
See application file for complete search history.

(56) References Cited

U.S. PATENT DOCUMENTS

| 5,109,370 A * | 4/1992 | Muramatsu | G11B 7/0946 369/124.14 |
|---|---|---|---|
| 2006/0072274 A1* | 4/2006 | Huang | H02H 9/001 361/97 |
| 2011/0176229 A1* | 7/2011 | Saito | G02B 7/102 359/824 |

FOREIGN PATENT DOCUMENTS

| JP | 4957192 B2 | 6/2012 |
|---|---|---|
| JP | 5891738 B2 | 3/2016 |
| KR | 10-1338707 B1 | 12/2013 |

* cited by examiner

*Primary Examiner* — Karen Masih
(74) *Attorney, Agent, or Firm* — Morgan, Lewis & Bockius LLP

(57) ABSTRACT

A method of operating a resolver management device according to the present invention includes: generating an excitation signal by using an external control signal; counting a time interval (a first delay time) to a first pole of the excitation signal based on one period of the external control signal by using an internal clock; receiving an excitation signal reflected from a resolver sensor; counting a time interval (a second delay time) to a second pole of the reflected excitation signal at the first pole by using the internal clock; and transmitting a first count value corresponding to the first delay time and a second count value corresponding to the second delay time to a microcontroller unit (MCU).

20 Claims, 9 Drawing Sheets

RESOLVER MANAGEMENT DEVICE, RESOLVER SYSTEM INCLUDING THE SAME, AND OPERATING METHOD THEREOF

CROSS-REFERENCE TO RELATED APPLICATIONS

This application claims priority to and the benefit of Korean Patent Application No. 10-2018-0031405 filed in the Korean Intellectual Property Office on Mar. 19, 2018, the entire contents of which are incorporated herein by reference.

TECHNICAL FIELD

The present invention relates to a resolver management device, a resolver system including the same, and an operating method thereof.

BACKGROUND ART

An alternating current motor control system is also applied to a hybrid electric vehicle, an electric vehicle, or the like to control an alternating current motor for operating a vehicle.

The alternating current motor control system controls the alternating current motor by using location information of a rotor mounted to the alternating current motor, and mainly uses a resolver for obtaining location information about the rotor.

The resolver is a device for measuring the degree of rotation of a rotary device, such as a motor or an engine, and is used for detecting a location of a rotor in a motor drive system requiring frequent variable speed change or precise location control.

SUMMARY OF THE INVENTION

The present invention has been made in an effort to provide a resolver management device which precisely measures a delay time, a resolver system including the same, and an operating method thereof.

An exemplary embodiment of the present invention provides a method of operating a resolver management device, the method including: generating an excitation signal by using an external control signal; counting a time interval (a first delay time) to a first pole of the excitation signal based on one period of the external control signal by using an internal clock; receiving an excitation signal reflected from a resolver sensor; counting a time interval (a second delay time) to a second pole of the reflected excitation signal at the first pole by using the internal clock; and transmitting a first count value corresponding to the first delay time and a second count value corresponding to the second delay time to a microcontroller unit (MCU).

In the exemplary embodiment, the external control signal may be a square-wave signal transmitted from the MCU, and the excitation signal may be a sine-wave signal.

In the exemplary embodiment, the method may further include: counting a reference count value related to a period of the external control signal by using the internal clock; and transmitting the reference count value to the MCU.

In the exemplary embodiment, the first delay time may be a time interval from a center of a maximum value of the external control signal to the first pole of the excitation signal.

In the exemplary embodiment, the first pole and the second pole may be peak values.

In the exemplary embodiment, the counting of the second delay time may include determining a second pole of the reflected excitation signal.

In the exemplary embodiment, the second pole may be determined by using a single threshold value or multiple threshold values.

In the exemplary embodiment, when the second pole is determined by using the multiple threshold values, a point corresponding to a center time of the shortest taken time among the times taken for processing comparisons of the respective threshold values with the reflected excitation signal may be determined as the second pole.

In the exemplary embodiment, when the second pole is determined by using the multiple threshold values, a peak value farthest from the first pole of the excitation signal among the peak values determined by processing comparisons of the respective threshold values with the reflected excitation signal may be determined as the second pole.

Another exemplary embodiment of the present invention provides a device for managing a resolver, the device including: an excitation signal generator configured to generate an excitation signal by using a received external control signal; an excitation signal receiver configured to receive an excitation signal reflected from a resolver sensor; a first delay detector configured to detect a driving delay time that is a time interval from one point of the excitation signal corresponding to one point of the external control signal to a first peak value of the excitation signal; a second delay detector configured to detect a reception delay time that is a time interval from the first peak value of the excitation signal to a second peak value of the reflected excitation signal; and a time information management device configured to transmit time delay information related to the driving delay time and the reception delay time to a microcontroller unit (MCU).

In the exemplary embodiment, the excitation signal generator may include a square wave-sine wave converter which converts the external control signal of a square wave to the excitation signal of a sine wave.

In the exemplary embodiment, the first delay detector may detect a time interval from one point of the excitation signal corresponding to a center of a maximum value of the external control signal to the first peak value of the excitation signal as the driving delay time.

In the exemplary embodiment, the first delay detector may include: one or more comparators; and a delay measuring device which determines a peak value of the excitation signal by using output values of the one or more comparators and counts the driving delay time by using an internal clock.

In the exemplary embodiment, when the second peak value is determined by using the multiple threshold values, the second delay detector may determine a point corresponding to a center time of the shortest taken time among the times taken for processing comparisons of the respective threshold values with the reflected excitation signal as the second peak value.

In the exemplary embodiment, when the second peak value is determined by using the multiple threshold values, the second delay detector may determine a peak value farthest from the first peak value among the peak values determined by processing comparisons of the respective threshold values with the reflected excitation signal as the second peak value.

In the exemplary embodiment, the second delay detector may include: a plurality of comparators; and a delay measuring device which determines a second peak value of the reflected excitation signal by using output values of the plurality of comparators, and counts the reception delay time by using an internal clock.

Still another exemplary embodiment of the present invention provides a resolver system, including: a microcontroller unit (MCU) configured to output an external control signal of a square wave; a resolver sensor configured to receive an excitation signal of a sine wave and output a reflected excitation signal; and a resolver management device configured to generate the excitation signal by using the external control signal from the MCU, and receive an excitation signal reflected from the resolver sensor.

In the exemplary embodiment, the resolver management device may transmit a first count value and a second count value to the MCU.

In the exemplary embodiment, the first count value may be a value obtained by counting an internal clock from a specific phase of the external control signal to a first peak value of the excitation signal.

In the exemplary embodiment, the second count value may be a value obtained by counting the internal clock from the first peak value of the excitation signal to a second peak value of the reflected excitation signal.

In the exemplary embodiment, the resolver management device may include: an excitation signal generator which generates the excitation signal by using the external control signal; an excitation signal receiver which receives the excitation signal reflected from the resolver sensor; a first delay detector which counts the first count value; a second delay detector which counts the second count value; and a time information managing device which transmits the first count value and the second count value to the MCU.

In the exemplary embodiment, the first delay detector may include: one or more comparators; and a delay measuring device which determines the first peak value by using output values of the one or more comparators and counts the first count value by using an internal clock.

In the exemplary embodiment, the second delay detector may include: a plurality of comparators; and a delay measuring device which determines a second peak value of the reflected excitation signal by using output values of the one or more comparators and counts the second count value by using an internal clock.

According to the resolver management device, the resolver system including the same, and the method of operating the same according to the exemplary embodiment of the present invention, it is possible to set the number of frequency counters transmitted from the outside as a reference, and then separate and accurately measure a delay time up to the generation of a frequency, a processing delay time of a reflected signal, and the like.

According to the resolver management device, the resolver system including the same, and the method of operating the same according to the exemplary embodiment of the present invention, information on the number of counters based on an external frequency is transmitted when delay information is transmitted, so that it is possible to accurately check an absolute value from the outside.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The accompanying drawings below are for helping to understand the present exemplary embodiment, and exemplary embodiments are provided together with the detailed description. However, a technical characteristic of the present exemplary embodiment is not limited to a specific drawing, and the characteristics disclosed in the drawings may be combined with each other to be configured as a new embodiment.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

In the following, the contents of the present invention will be described clearly and in detail by using the drawings so that those skilled in the art can easily carry out the present invention.

The present invention may be variously changed and have various forms, so that specific exemplary embodiments will be exemplified in the drawings and described in detail in the description below. However, this does not intend to limit the present invention to a specific disclosure form, and it will be appreciated that the present invention includes all of the modifications, equivalent matters, and substitutes included in the spirit and the technical scope of the present invention.

Terms, such as first and second, may be used for describing various constituent elements, but the constituent elements are not limited by the terms.

The terms are used only to discriminate one constituent element from another constituent element. For example, without departing from the scope of the invention, a first constituent element may be named as a second constituent element, and similarly a second constituent element may also be named as a first constituent element. It should be understood that when one constituent element is referred to as being "coupled to" or "connected to" another constituent element, one constituent element can be directly coupled to or connected to the other constituent element, but intervening elements may also be present. By contrast, when one constituent element is referred to as being "directly coupled to" or "directly connected to" another constituent element, it should be understood that there are no intervening elements.

Other expressions, that is, "between ~" and "just between ~", or "adjacent to ~" and "directly adjacent to ~ "explaining a relationship between the constituent elements should be interpreted in the same way. Terms used in the present application are used only to describe specific exemplary embodiments, and are not intended to limit the present invention. Singular expressions used herein include plurals expressions unless they have definitely opposite meanings in the context.

In the present application, it will be appreciated that terms "including" and "having" are intended to designate the existence of characteristics, numbers, steps, operations, constituent elements, and components described in the specification or a combination thereof, and do not exclude a possibility of the existence or addition of one or more other characteristics, numbers, steps, operations, constituent elements, and components, or a combination thereof in advance. All terms used herein including technical or scientific terms have the same meanings as meanings which are generally understood by those skilled in the art unless they are differently defined. Terms defined in a generally used dictionary shall be construed that they have meanings matching those in the context of a related art, and shall not be construed in ideal or excessively formal meanings unless they are clearly defined in the present application.

Figure 1:
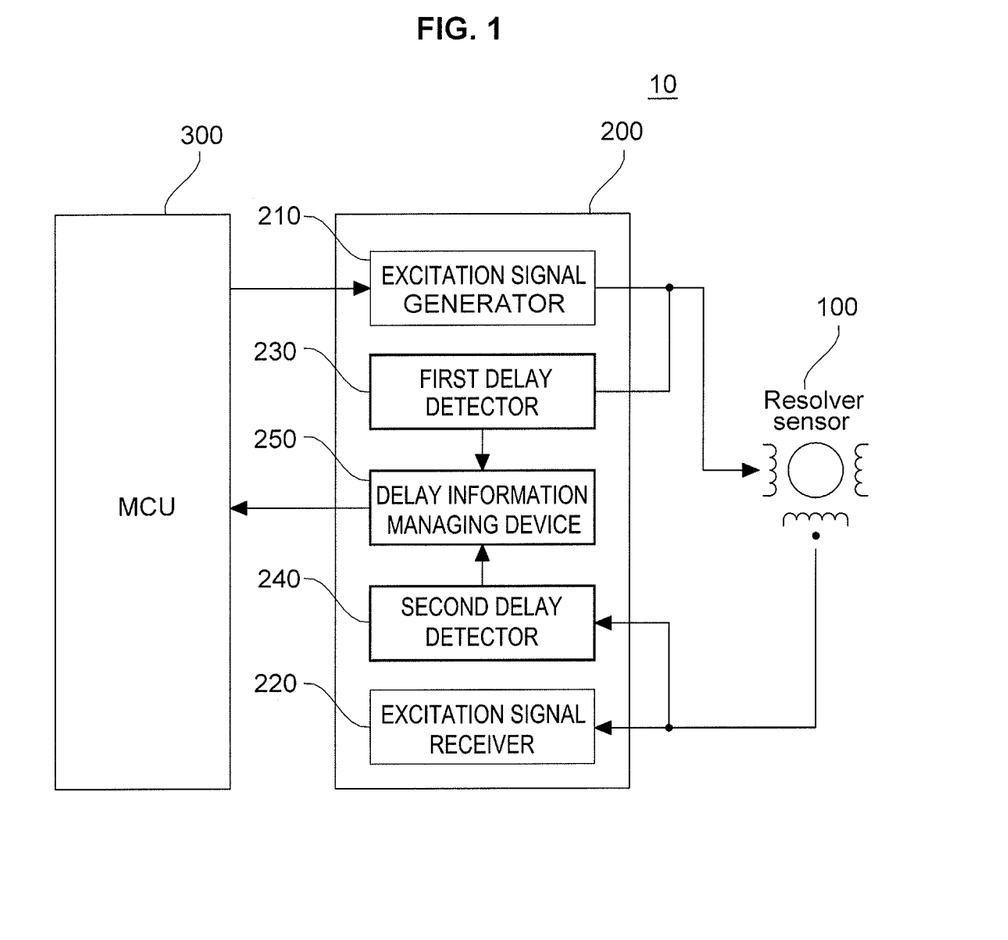
FIG. 1 is a diagram illustrating an example of a resolver system 10 according to an exemplary embodiment of the present invention.

FIG. 1 is a diagram illustrating an example of a resolver system 10 according to an exemplary embodiment of the present invention.

Referring to FIG. 1, the resolver system 10 may include a resolver sensor 100, a resolver management device 200, and a micro controller unit (MCU) 300. In the exemplary embodiment, the resolver management device 200 and the MCU 300 may be mounted on one board.

The resolver sensor 100 is an analog angle detecting sensor, which converts mechanical angle displacement of a motor to an electric signal by using an electromagnetic induction phenomenon.

The resolver sensor 100 may be implemented so as to generate a reflected excitation signal (a sine-wave signal and/or a cosine-wave signal) by receiving an excitation signal and modulating the excitation signal by a stator coil.

The resolver management device 200 may be implemented so as to measure a delay time between an excitation signal applied from the resolver management device 200 to the resolver sensor 100 and a reflected excitation signal output through the resolver sensor 100, and compensate for and diagnose the delay time.

The resolver management device 200 may include an excitation signal generator 210, an excitation signal receiver 220, a first delay detector 230, a second delay detector 240, and a delay information management device 250.

The excitation signal generator 210 is implemented to receive a control signal of a square wave from the MCU 300, and generate an excitation signal.

Herein, the excitation signal may be a sine wave signal having a predetermined frequency. In the exemplary embodiment, the excitation signal generator 210 may include a square wave-sine wave converter.

The resolver signal receiver 220 may be implemented so as to receive the excitation signal (for example, a sine wave signal or a cosine wave signal) reflected from the resolver sensor 100.

The first delay detector 230 may be implemented so as to detect a first delay time between the control signal of the square wave received from the MCU 300 and the excitation signal of the sine wave generated in the excitation signal generator 210. Herein, the first delay time may be referred to as a driving delay time.

In the exemplary embodiment, the first delay detector 230 may detect the first delay time (driving delay time) by counting an internal clock up to a peak value of the excitation signal from a specific phase of the sine wave signal.

In the exemplary embodiment, the internal clock may be generated from an oscillator present inside the resolver management device 200. In the meantime, it will be appreciated that the method of detecting the first delay time is not limited thereto.

The second delay detector 240 may be implemented so as to detect a second delay time between the excitation signal output to the resolver sensor 100 and the reflected excitation signal received from the resolver sensor 100. Herein, the second delay time may be referred to as a reception delay time.

In the exemplary embodiment, the second delay detector 240 may detect the second delay time (reception delay time) by counting an internal clock up to a peak value of the excitation signal and a peak value of the reflected excitation signal.

In the exemplary embodiment, the internal clock may be generated from the oscillator present inside the resolver management device 200. In the meantime, it will be appreciated that the method of detecting the second delay time is not limited thereto.

The delay information management device 250 may be implemented so as to store a first count value related to the first delay time, a second count value related to the second delay time, and a count value related to a period of a control signal, and to transmit the stored count information to the MCU 300.

The MCU 300 may calculate a delay time of the resolver sensor 100 based on the count information.

In another exemplary embodiment, the delay information management device 250 may be implemented so as to determine a delay time of the resolver sensor 100 by using the first delay time (driving delay time) and the second delay time (reception delay time).

For example, the delay information management device 250 may calculate a count value corresponding to a delay time of the resolver sensor 100 by subtracting the first count value corresponding to the first delay time from the second count value corresponding to the second delay time.

In the meantime, the first delay detector 230, the second delay detector 240, and the delay information management device 250 may be called one delay detecting circuit. The delay detecting circuit may be implemented so as to detect a delay time between the excitation signal and the signal received from the resolver sensor 100.

In the exemplary embodiment, when the delay time is an equal to or larger than a threshold value, the delay detecting circuit may recognize a situation of the resolver sensor 100 as a fault situation and transmit error information to the MCU 300, and the MCU 300 process the resolver sensor 100 to have a fault.

In the exemplary embodiment, when the delay time is less than the threshold value, the delay detecting circuit may transmit the delay time information to the MCU 300. In this case, the MCU 300 may synchronize the excitation signal and the output signal of the resolver sensor 100 by correcting the excitation signal input to the resolver sensor 100 in accordance with the delay time information.

The delay detecting circuit may be implemented to diagnose a fault, that is, disconnection, short-circuit, overvoltage, overcurrent, and the like, of the resolver sensor 100. For example, when the output signal of the resolver sensor 100 maintains a predetermined level for a predetermined time, the delay detecting circuit may diagnose a signal line to be disconnected.

The resolver management device 200 according to the exemplary embodiment of the present invention may directly process a resolver output signal by using an analog/digital converter within the resolver management device 200 without using a separate resolver/digital converting circuit, detect open/short of the resolver sensor 100 and a state of each output terminal through internal diagnosis logic, and transmit the corresponding state to the MCU 300 through a communication device.

When the delay between the excitation signal and the resolver output signal does not reach the threshold value, the MCU 300 processes the excitation signal to be corrected by the delay, and when the delay between the excitation signal and the resolver output signal is equal to or larger than the threshold value, the MCU 300 may process that the resolver sensor 100 has a fault.

In the meantime, the resolver management device 200 may be implemented with an Integrated Circuit (IC).

The MCU 300 may be implemented so as to control a general operation of the resolver system 10. Although not illustrated, the MCU 300 may include a square wave generator, an analog-digital converter, and a calculation unit.

The square wave generator may be implemented so as to generate a square wave in order to generate an excitation signal. The analog-digital converter may be implemented so as to convert analog signals of the resolver signal receiver 200 to digital signals.

The calculation unit may be implemented so as to receive the delay time information (for example, the internal clock count value) from the delay information management device 250, and calculate the degree of correction of the excitation signal corresponding to the delay time information.

In the exemplary embodiment of the present invention, the resolver system 10 may be implemented so as to measure/compensate for a delay time generable by a position within a vehicle between the resolver management device 200 controlling the resolver sensor 100 and the resolver sensor, the kind of resolver, and hardware.

In the resolver system 10 according to the exemplary embodiment of the present invention, the resolver management device 200 determines a relative count value based on an external control signal output from the MCU 300 as a delay time without a synchronization signal, thereby more precisely measuring a delay time of the resolver sensor 100.

Figure 2:
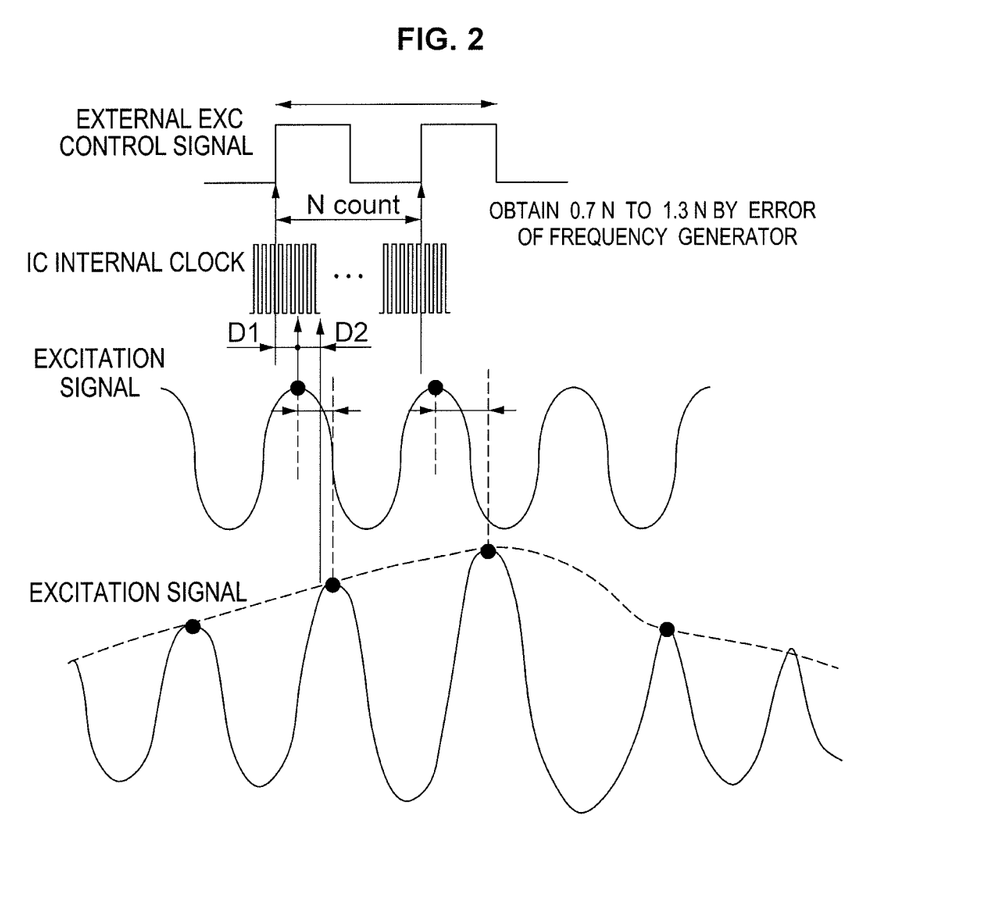
FIG. 2 is a diagram illustrating an example of a process of detecting a delay time of a resolver management device 200 according to an exemplary embodiment of the present invention.

FIG. 2 is a diagram illustrating an example of a process of detecting a delay time of the resolver management device 200 according to the exemplary embodiment of the present invention.

An external control signal of a square wave may be received in the resolver management device 200 from the MCU 300. A counting operation using an IC internal clock may be initiated from a rising edge of the external control signal.

In the meantime, those skilled in the art will be appreciated that the initiation time point of the counting operation is not essentially limited thereto. As illustrated in FIG. 2, N times of counting operation may be performed during a period of the external control signal.

The first delay detector 230 (see FIG. 1) may count a time interval from one point (for example, a point corresponding to the rising edge of the external control signal) of the excitation signal generated from the excitation signal generator 210 (see FIG. 1) to any one pole and generate a first count value D1.

Herein, the first count value D1 is a value corresponding to an actual EXC driving delay time. In the exemplary embodiment, the pole may be a maximum value, that is, a peak value, of the excitation signal. In another exemplary embodiment, the pole may also be a minimum value of the excitation signal.

The second delay detector 240 (see FIG. 1) may count a time interval from any one pole of the excitation signal generated from the excitation signal generator 210 (see FIG. 1) to the pole of the excitation signal reflected from the resolver sensor 100, and generate a second count value D2.

Herein, the first count value D2 is a value corresponding to the reception time delay time. In the exemplary embodiment, the pole may be a maximum value, that is, a peak value, of the excitation signal. In another exemplary embodiment, the pole may also be a minimum value of the excitation signal.

In the exemplary embodiment, the external control signal transmitted from the MCU 300 (see FIG. 1) may be used for measuring the number of internal counters. For example, the counter of the external control signal output from the MCU 300 may be substituted with the number of counters of the internal oscillator.

When an internal frequency is changed, the number of relative counters may be changed as a reference. Accordingly, the resolver management device 200 (see FIG. 1) may provide the MCU 300 with information about the delay time to the external signal without a frequency synchronization circuit.

The resolver management device 200 may accurately measure each of a driving delay time that is a time interval from a reception time of the control signal to a generation time of the excitation signal and a reception delay time that is a time interval from an output time of the excitation signal to the resolver sensor 100 (see FIG. 1) to a reception time of the reflected excitation signal.

The resolver management device 200 may transmit the number of reference clocks (external input value monitoring), the first count value D1, the second count value D2, and each additional delay value to the MCU 300 (see FIG. 1) based on the clock through the communication.

In the exemplary embodiment, when the MCU outputs a control signal at 10 kHz (a period of 100 u) and the internal clock is output at 12 MHz (a period of 82 ns), a reference value for the control signal period may be 1,219 count, D1 may be 243 count when a time interval is 20 us, and D2 may be 182 count when a time interval is 15 us.

In this case, the resolver management device 200 may transmit final values (1,219, 243, and 182) to the MCU 300. The MCU 300 may substitute D1 for the internal clock* (243/1,219).

In another exemplary embodiment, when an external MCU outputs a control signal at 10 kHz (a period of 100 u) and the internal clock is output at 7 MHz (a period of 142 ns), a reference value for the control signal period may be 704 count, D1 may be 140 count when a time interval is 20 us, and D2 may be 105 count when a time interval is 15 us.

In this case, the resolver management device 200 may transmit final values (704, 140, and 105) to the MCU 300. The MCU 300 may substitute D1 for the internal clock* (243/1,219).

A resolver management device in the related art accumulates and measures a delay time through an experiment, designates one reference value by utilizing constant data, and simply calculates a time difference between the two signals.

In the meantime, the resolver management device 200 according to the exemplary embodiment of the present invention may calculate a delay time from the reception time of the external control signal to the reception time of the excitation signal reflected by the resolver sensor.

The resolver management device 200 according to the exemplary embodiment of the present invention may accurately determine a delay time outside regardless of an error of the internal frequency generator (frequency generator error ±30%).

The resolver management device 200 according to the exemplary embodiment of the present invention reconfigures the number of relative counters based on a signal provided from the outside for driving the sensor, thereby accurately providing a delay time. That is, despite the error of the internal frequency, it is possible to express all of the delay times with the relative count value.

The resolver system 10 according to the exemplary embodiment of the present invention may determine a time of an external resolver driving signal as a reference of the delay time. In the exemplary embodiment, the MCU 300 may convert a total length of one period of the external signal to the number of counters regardless of the generation of the error of the resolver management device 200. In the exemplary embodiment, each delay time may be calculated with a ratio of the number of reference counters.

In the exemplary embodiment, when the period of the external driving signal is changed, a reference time change may be updated. In the exemplary embodiment, a high-rank determining block (for example, the MCU) may calculate a relative time by providing the reference signal and predetermined internal delay time information together. In the exemplary embodiment, the high-rank determining block counter-estimates the directly provided external resolver driving signal time, thereby accurately determining an absolute time.

The resolver management device 200 according to the exemplary embodiment of the present invention may measure a delay time of a phase detection of the resolver sensor. Actually, the internal frequency generator has an error of ±30%, so that there is a limitation in accurately giving an absolute time.

The resolver management device 200 according to the exemplary embodiment of the present invention may set the number of frequency counters transmitted from the outside as a reference, and then separate and accurately measure a delay time up to the generation of a frequency, a processing delay time of a reflected signal, and the like. Further, information on the number of counters based on the external frequency is transmitted when the delay information is transmitted, so that it is possible to accurately check an absolute value from the outside (the MCU).

Figure 3:
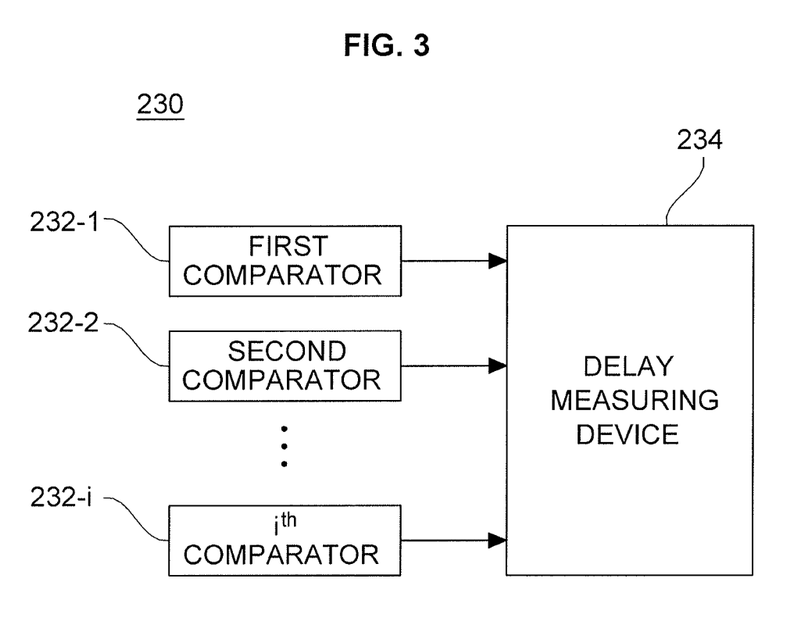
FIG. 3 is a diagram illustrating an example of a first delay detector 230 according to the exemplary embodiment of the present invention.

FIG. 3 is a diagram illustrating an example of the first delay detector 230 according to the exemplary embodiment of the present invention. Referring to FIG. 3, the first delay detector 230 may include a first comparator 232-1, a second comparator 232-2, . . . , and an $i^{th}$ comparator 232-(i is a natural number equal to or larger than 2), and a first delay measuring device 234.

The first comparator 232-1 may be implemented so as to output a first threshold value.

The second comparator 232-2 may be implemented so as to output a second threshold value. Herein, the second threshold value may be larger than the first threshold value. However, the present invention is not essentially limited thereto. The second threshold value may be smaller than the first threshold value. The $i^{th}$ comparator 232-may be implemented so as to output an $i^{th}$ threshold value.

The first delay measuring device 234 detects a pole of the excitation signal generated by the excitation signal generator 210 by using the first threshold value, the second threshold value, . . . , and the $i^{th}$ threshold value.

The first delay measuring device 234 may be implemented so as to count a time interval from a point corresponding to a predetermined point (for example, a rising edge) of an external control signal to the detected pole by using an internal clock, and output a count value of the internal clock as a first delay time.

In the meantime, the first delay detector 230 illustrated in FIG. 3 detects the pole of the excitation signal by using the multiple threshold values, but may also be implemented so as to detect a pole of the excitation signal by using a single threshold value.

Figure 4:
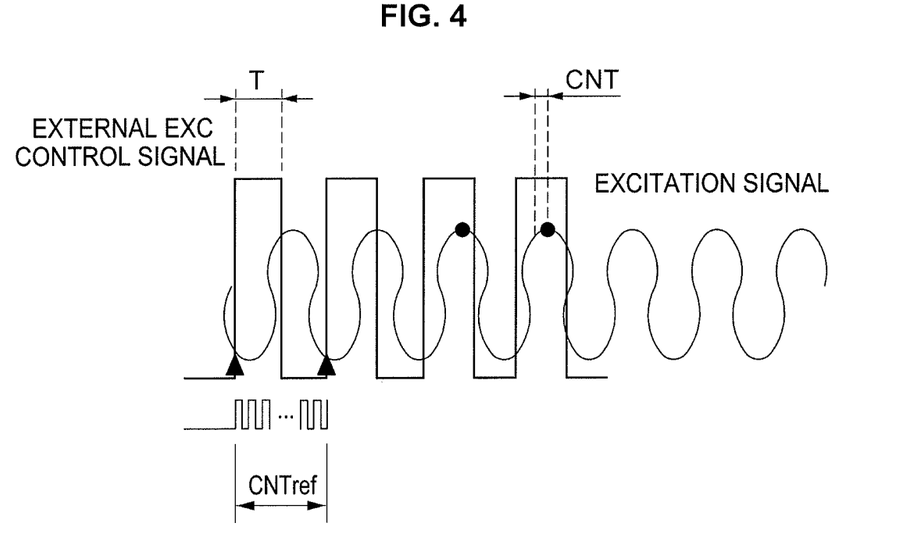
FIG. 4 is a diagram illustrating an example of a process of measuring a delay time by a first delay measuring device 234 illustrated in FIG. 3.

FIG. 4 is a diagram illustrating an example of a process of measuring the first delay time by the first delay measuring device 234 illustrated in FIG. 3.

As illustrated in FIG. 4, a count value CNTref of an internal clock corresponding to one period T of an external control signal of a square wave may be used as a reference value (reference count value). That is, during one period T of the external control signal, the internal clock is counted by the count value. A count value CNT from a center of a maximum value of the external control signal to a peak value of the excitation signal of the sine wave may be the first delay time (driving delay time).

Figure 5:
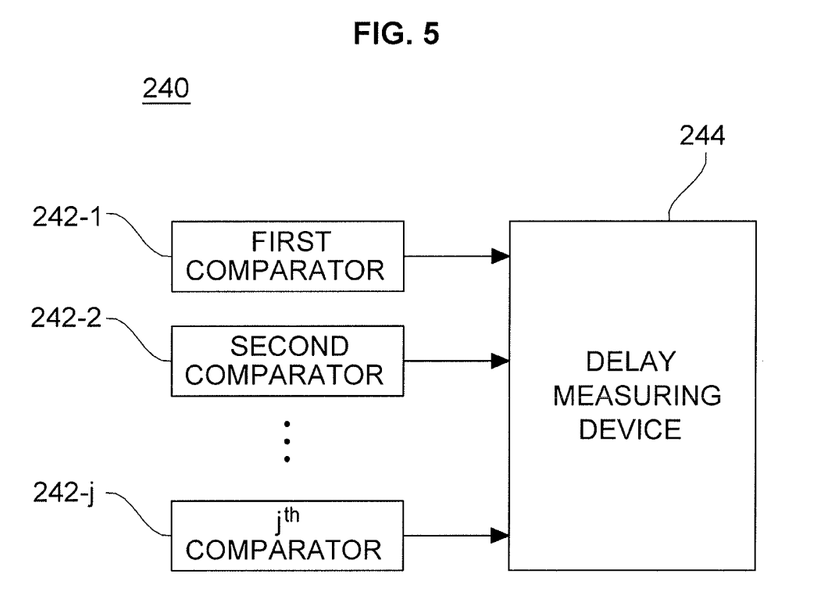
FIG. 5 is a diagram illustrating an example of a second delay detector 240 according to the exemplary embodiment of the present invention.

FIG. 5 is a diagram illustrating an example of the second delay detector 240 according to the exemplary embodiment of the present invention. Referring to FIG. 5, the second delay detector 240 may include a first comparator 242-1, a second comparator 242-2, . . . , and a $j^{th}$ comparator 242-j (j is a natural number equal to or larger than 2), and a second delay measuring device 244. The second delay detector 240 of FIG. 5 performs a similar operation to the operation of the delay detector 230 illustrated in FIG. 3.

Figure 6:
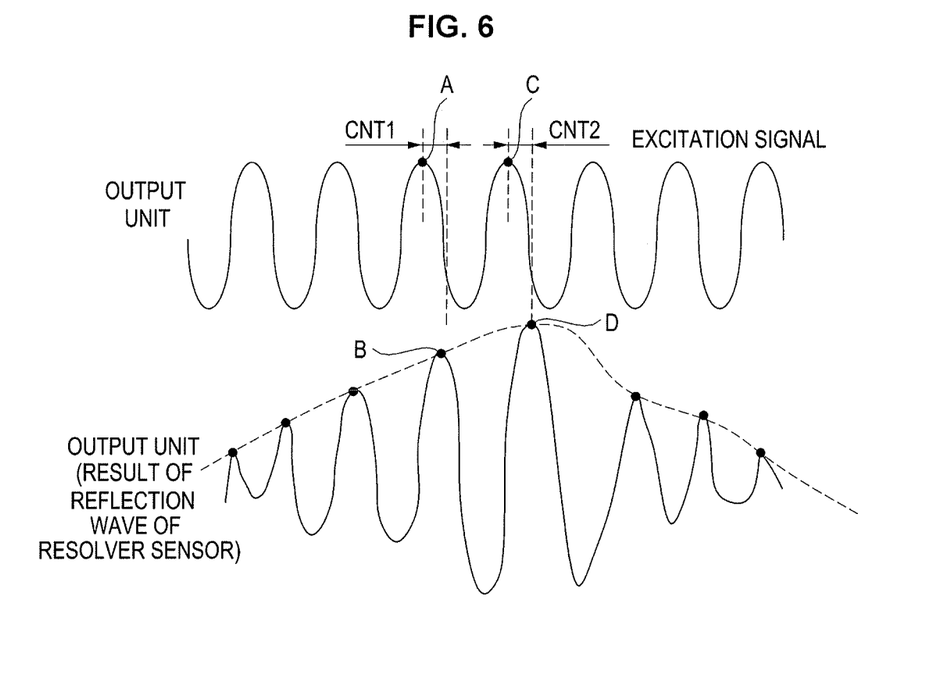
FIG. 6 is a diagram illustrating an example of a process of measuring a delay time by a second delay measuring device 244 illustrated in FIG. 5.

FIG. 6 is a diagram illustrating an example of a process of measuring the delay time by the second delay measuring device 244 illustrated in FIG. 5.

As illustrated in FIG. 6, a first count value CNT1 obtained by counting a time interval between a peak value (point A) of an excitation signal and a peak value (point B) of the reflected excitation signal, and a second count value CNT2 obtained by counting a time interval between a peak value (point C) of the excitation signal of a next period and a peak value (point D) of the reflected excitation signal of the next period may be output. Accordingly, the delay time between the poles (between point A and point B, and between point C and point D) may be output in real time, and each of the first count value CNT1 and the second count value CNT2 may be the second delay time (reception delay time).

Figure 7:
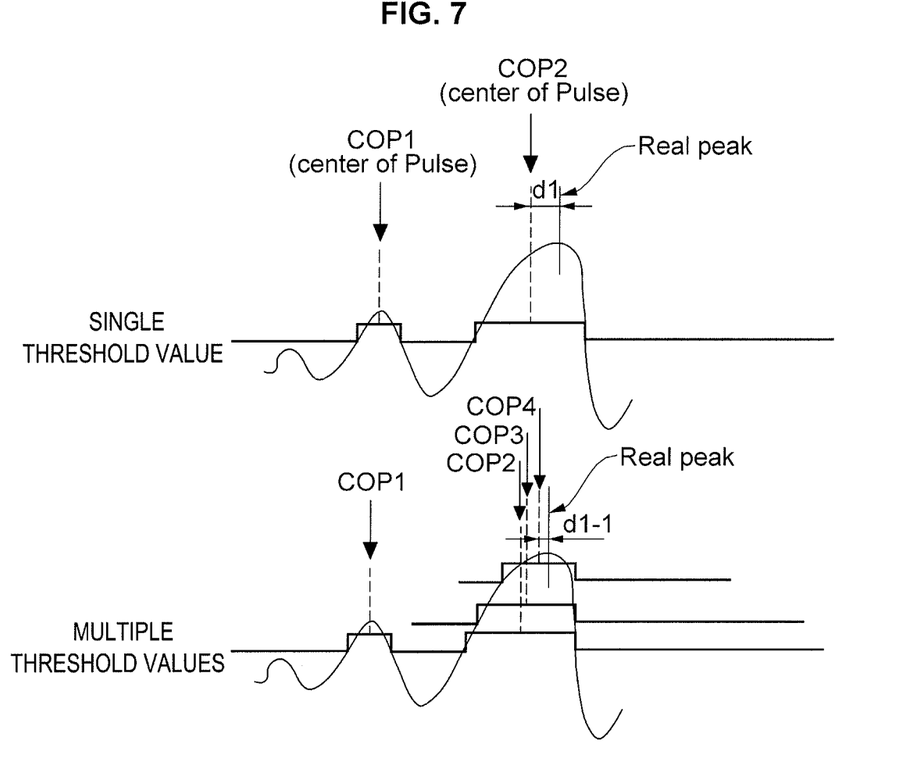
FIG. 7 is a diagram illustrating an example of a process of obtaining a pole through a single threshold value and multiple threshold values.

FIG. 7 is a diagram illustrating an example of a process of obtaining a pole through a single threshold value and multiple threshold values.

Referring to FIG. 7, it is assumed that a center value in a wavelength form of a first amplitude based on the first threshold value is referred to as a first center value COP1, and a center value in a distorted wavelength form of a second amplitude based on the first threshold value is referred to as a second center value COP2.

It is assumed that a center value in a distorted wavelength form of a second amplitude based on the second threshold value is referred to as a third center value COP3, and a center value in a distorted wavelength form of the second amplitude based on the third threshold value is referred to as a fourth center value COP4.

When a pole is predicted by using a single threshold value, an error d1 may be generated between the second center value COP2 in the distorted waveform of the second amplitude and an actual peak value.

In the meantime, when the multiple threshold values are used for detecting a pole, an error d1-1 may be generated between the fourth center value COP4 in the distorted waveform of the second amplitude and an actual peak value.

The pole prediction error d1-1 generated when the multiple threshold values are used may be smaller than the pole prediction error d1 generated when the single threshold value is used. As described above, it is possible to accurately predict the pole as it goes to the topmost value where the pole is detected by using the multiple threshold values.

When the pole is determined by using the multiple threshold values, a peak value farthest from the pole of the excitation signal among the peak values determined by comparing respective threshold values with the reflected excitation signal may be determined as a pole of the reflected excitation signal.

According to an operation characteristic of the resolver system, the reflected excitation signal does not have uniform amplitude like an AM signal, so that it is preferable to use the multiple threshold values for detecting a pole.

Figure 8:
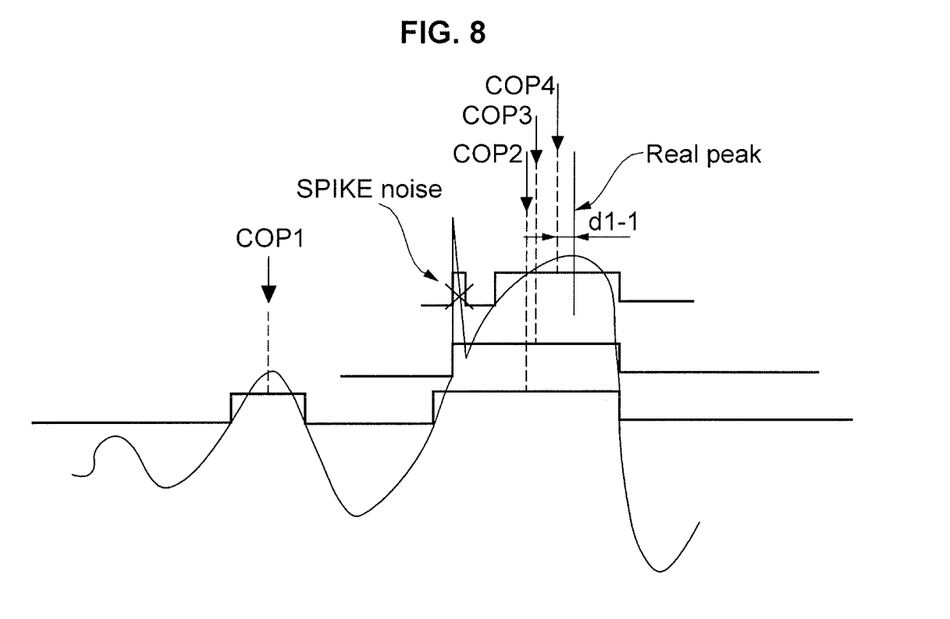
FIG. 8 is a diagram illustrating an example of a process or removing a spike in a processing of obtaining a pole through multiple threshold values according to the exemplary embodiment of the present invention.

FIG. 8 is a diagram illustrating an example of a process or removing a spike in the processing of obtaining a pole through multiple threshold values according to the exemplary embodiment of the present invention.

Referring to FIG. 8, a spike pulse generated at the topmost threshold point may be removed. The second delay measuring device 244 may check the number of internal counters, and when a delay time is within a predetermined time, the second delay measuring device 244 may recognize that spike noise is generated and may not determine that the number of internal counts is a valid value.

In the exemplary embodiment, the resolver management device may separately obtain a delay time of each processing step based on a signal input from the outside. In the exemplary embodiment, the resolver management device may process multiple comparisons by using multiple threshold values in a process of acquiring a pole for processing a delay time.

In the exemplary embodiment, the resolver management device may acquire a point corresponding to a center time among the times taken for the processing of the comparisons as a pole.

For example, when it is assumed that a processing time of 10 ms is taken in the case where the resolver management device applies the first threshold value to a signal, a point of the signal corresponding to a time of 5 ms may be acquired as a pole.

In the exemplary embodiment, the resolver management device may determine the pole acquired through the processing of the comparison with the topmost threshold value among the plurality of poles (valid poles) acquired according to the processing of the multiple comparisons as the most valid pole.

In the exemplary embodiment, the resolver management device may determine an optimum delay time through processing, such as average calculation of the valid poles. In the exemplary embodiment, the resolver management device may not determine a pole, at which it does not take a predetermined time for acquisition, among the acquired poles as a valid pole.

Figure 9:
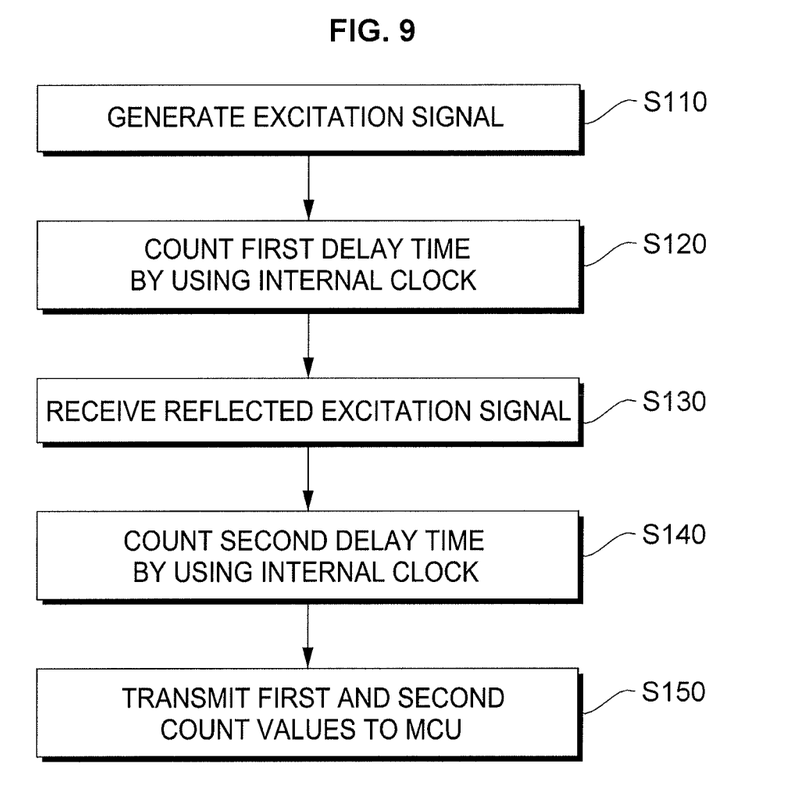
FIG. 9 is a flowchart illustrating an example of a method of operating the resolver management device 200 according to an exemplary embodiment of the present invention.

FIG. 9 is a flowchart illustrating an example of a method of operating the resolver management device 200 according to an exemplary embodiment of the present invention. Referring to FIGS. 1 to 9, the resolver management device 200 may be operated as described below.

The resolver management device 200 may receive an external control signal of a square wave from the MCU 300, and generate an excitation signal of a sine wave having a predetermined frequency (S110).

The resolver management device 200 may count a reference count value regulating the number of times of the counting an internal clock for one period of the external control signal and a time interval (a first delay time) from one point of the excitation signal corresponding to a predetermined point (for example, a rising edge) of the external control signal based on one period of the external control signal to the peak value by using the internal clock (S120).

In operation S120, a count value (the first count value) of the internal clock is the first delay time. The resolver management device 200 may receive the excitation signal reflected from the resolver sensor 100 (S130). Herein, the reflected excitation signal may be a sine-wave signal or a cosine-wave signal.

In operation S130, the resolver management device 200 may determine a peak value of the reflected excitation signal by applying a threshold value to the reflected excitation signal.

In this case, when the resolver management device 200 determines the peak value of the reflected excitation signal by applying multiple threshold values to the reflected excitation signal, the resolver management device 200 may determine a point corresponding to a center time of the shortest taken time among the times taken for processing the comparison between the respective threshold values and the reflected excitation signal as a peak value.

For example, when it is assumed that 20 ms is taken for processing the comparison between a first threshold value and the reflected excitation signal, 15 ms is taken for processing the comparison between a second threshold value and the reflected excitation signal, and 10 ms is taken for processing the comparison between a third threshold value and the reflected excitation signal, the resolver management device 200 may determine a point of the reflected excitation signal corresponding to a time of 5 ms that is a center of 10 ms as a peak value.

The resolver management device 200 may count a time interval (a second delay time) between the peak value of the excitation signal and the peak value of the reflected excitation signal by using the internal clock (S140).

In S140, a count value (a second count value) of the internal clock is a second delay time.

The resolver management device 200 may transmit the reference count value and the first and second count values to the MCU 300 (S150). The MCU 300 may calculate a delay time of the resolver sensor 100 by using the transmitted count values.

The steps and/or the operations according to the present invention may be simultaneously incurred in other exemplary embodiments in a different order, in parallel, or for another epoch, which will be understood by those skilled in the art.

Depending on an exemplary embodiment, a part or all of the steps and/or the operations may be implemented or performed by using one or more processors driving a command stored in one or more non-temporary computer-readable media, a program, an interactive data structure, a client, and/or a server. An example of the one or more non-temporary computer-readable media may be software, firmware, hardware, and/or any combination thereof. Further, a function of "module" discussed in the present specification may be implemented by software, firmware, hardware, and/or any combination thereof.

One or more non-temporary computer-readable media and/or means for implementing/performing one or more operations/steps/modules of the exemplary embodiments of the present invention may include Application-Specific integrated Circuits (ASICs), standard integrated circuits, a microcontroller, a controller performing appropriate commands, an embedded controller, Field-Programmable gate Arrays (FPGAs), Complex Programmable Logic Devices (CPLDs), and the equivalent matters thereof, but are not limited thereto.

In the meantime, the contents of the present invention are simply the particular exemplary embodiments for carrying out the present invention. The present invention may include a technical spirit that is abstract and conceptual idea utilizable as a technology in the future, as well as a particular and actually usable means itself.

Meanwhile, the embodiments according to the present invention may be implemented in the form of program instructions that can be executed by computers, and may be recorded in computer readable media. The computer readable media may include program instructions, a data file, a data structure, or a combination thereof. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A method of operating a resolver management device, the method comprising:
   generating an excitation signal by using an external control signal;
   counting a first delay time to a first pole of the excitation signal based on one period of the external control signal by using an internal clock;
   receiving an excitation signal reflected from a resolver sensor;
   counting a second delay time to a second pole of the reflected excitation signal at the first pole by using the internal clock; and
   transmitting a first count value corresponding to the first delay time and a second count value corresponding to the second delay time to a microcontroller unit (MCU).

2. The method of claim 1, wherein the external control signal is a square-wave signal transmitted from the MCU, and
   the excitation signal is a sine-wave signal.

3. The method of claim 1, further comprising:
   counting a reference count value related to a period of the external control signal by using the internal clock; and
   transmitting the reference count value to the MCU.

4. The method of claim 1, wherein the first delay time is a time interval from a center of a maximum value of the external control signal to the first pole of the excitation signal.

5. The method of claim 1, wherein the first pole and the second pole are peak values.

6. The method of claim 1, wherein the counting of the second delay time includes determining a second pole of the reflected excitation signal.

7. The method of claim 6, wherein the second pole is determined by using a single threshold value or multiple threshold values.

8. The method of claim 7, wherein when the second pole is determined by using the multiple threshold values, a point corresponding to a center time of the shortest taken time among the times taken for processing comparisons of the respective threshold values with the reflected excitation signal is determined as the second pole.

9. The method of claim 7, wherein when the second pole is determined by using the multiple threshold values, a peak value farthest from the first pole of the excitation signal among the peak values determined by processing comparisons of the respective threshold values with the reflected excitation signal is determined as the second pole.

10. A device for managing a resolver, the device comprising:
- an excitation signal generator configured to generate an excitation signal by using a received external control signal;
- an excitation signal receiver configured to receive an excitation signal reflected from a resolver sensor;
- a first delay detector configured to detect a driving delay time that is a time interval from one point of the excitation signal corresponding to one point of the external control signal to a first peak value of the excitation signal;
- a second delay detector configured to detect a reception delay time that is a time interval from the first peak value of the excitation signal to a second peak value of the reflected excitation signal; and
- a time information management device configured to transmit time delay information related to the driving delay time and the reception delay time to a microcontroller unit (MCU).

11. The device of claim 10, wherein the excitation signal generator includes a square wave-sine wave converter which converts the external control signal of a square wave to the excitation signal of a sine wave.

12. The device of claim 10, wherein the first delay detector detects a time interval from one point of the excitation signal corresponding to a center of a maximum value of the external control signal to the first peak value of the excitation signal as the driving delay time.

13. The device of claim 10, wherein the first delay detector includes:
- one or more comparators; and
- a delay measuring device which determines a peak value of the excitation signal by using output values of the one or more comparators and counts the driving delay time by using an internal clock.

14. The device of claim 10, wherein when the second peak value is determined by using the multiple threshold values, the second delay detector determines a point corresponding to a center time of the shortest taken time among the times taken for processing comparisons of the respective threshold values with the reflected excitation signal as the second peak value.

15. The device of claim 10, wherein when the second peak value is determined by using the multiple threshold values, the second delay detector determines a peak value farthest from the first peak value among the peak values determined by processing comparisons of the respective threshold values with the reflected excitation signal as the second peak value.

16. The device of claim 10, wherein the second delay detector includes:
- a plurality of comparators; and
- a delay measuring device which determines a second peak value of the reflected excitation signal by using output values of the plurality of comparators, and counts the reception delay time by using an internal clock.

17. A resolver system, comprising:
- a microcontroller unit (MCU) configured to output an external control signal of a square wave;
- a resolver sensor configured to receive an excitation signal of a sine wave and output a reflected excitation signal; and
- a resolver management device configured to generate the excitation signal by using the external control signal from the MCU, and receive an excitation signal reflected from the resolver sensor;
- wherein the resolver management device transmits a first count value and a second count value to the MCU, the first count value is a value obtained by counting an internal clock from a specific phase of the external control signal to a first peak value of the excitation signal, and the second count value is a value obtained by counting the internal clock from the first peak value of the excitation signal to a second peak value of the reflected excitation signal.

18. The resolver system of claim 17, wherein the resolver management device includes:
- an excitation signal generator which generates the excitation signal by using the external control signal;
- an excitation signal receiver which receives the excitation signal reflected from the resolver sensor;
- a first delay detector which counts the first count value;
- a second delay detector which counts the second count value; and
- a time information managing device which transmits the first count value and the second count value to the MCU.

19. The resolver system of claim 18, wherein the first delay detector includes:
- one or more comparators; and
- a delay measuring device which determines the first peak value by using output values of the one or more comparators and counts the first count value by using an internal clock.

20. The resolver system of claim 18, wherein the second delay detector includes:
- a plurality of comparators; and
- a delay measuring device which determines a second peak value of the reflected excitation signal by using output values of the plurality of comparators and counts the second count value by using an internal clock.

* * * * *